Jan. 17, 1950
C. S. SZEGHO
2,495,035
SCHMIDT PROJECTOR HAVING CATHODE-RAY
TUBE COMPRISING SPHERICAL MIRROR
Filed May 13, 1942
2 Sheets-Sheet 1
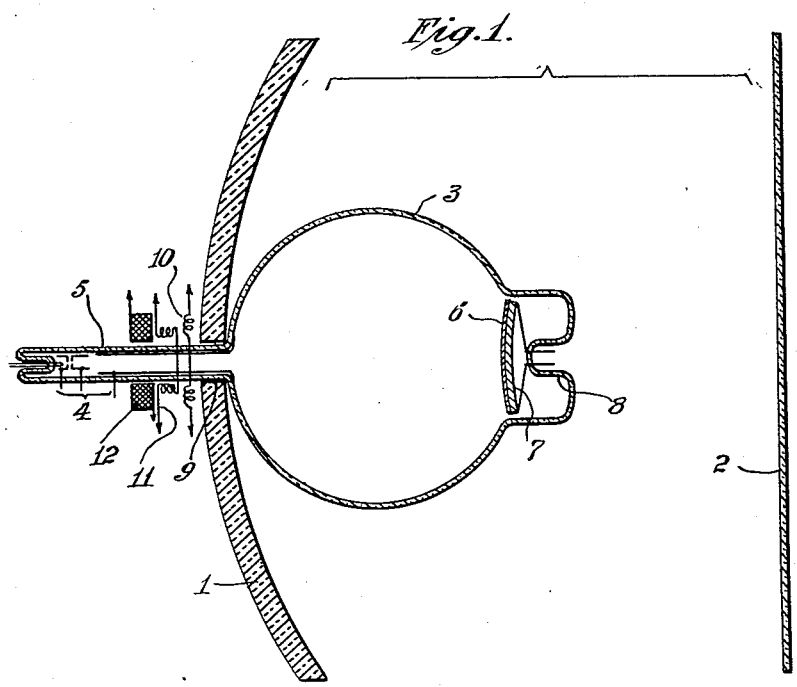
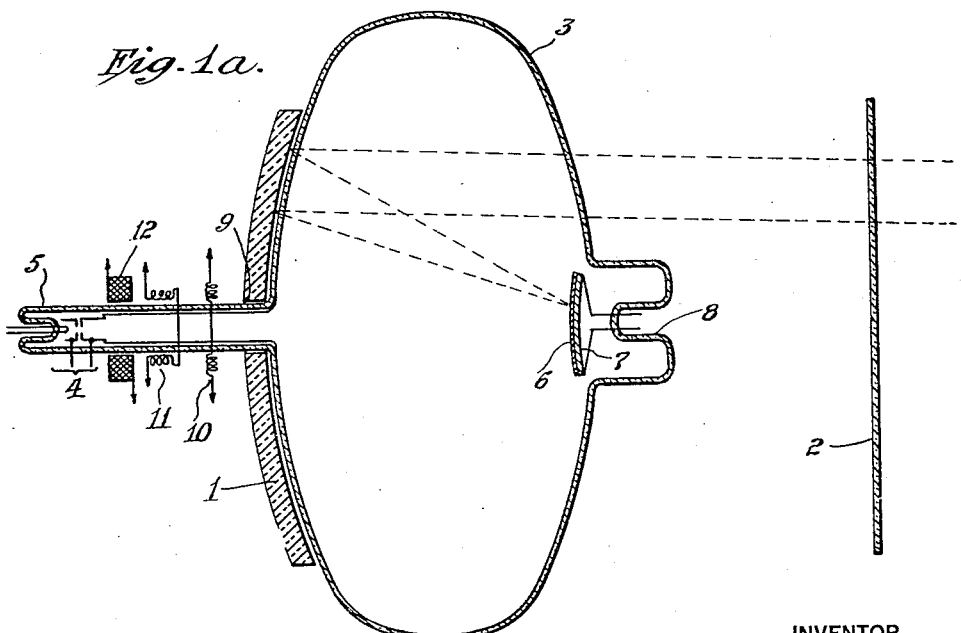
INVENTOR
Constantin S. Szegho
BY Paul Kolisch
ATTORNEY Jan. 17, 1950
C. S. SZEGHO
2,495,035
SCHMIDT PROJECTOR HAVING CATHODE-RAY
TUBE COMPRISING SPHERICAL MIRROR
Filed May 13, 1942
2 Sheets-Sheet 2
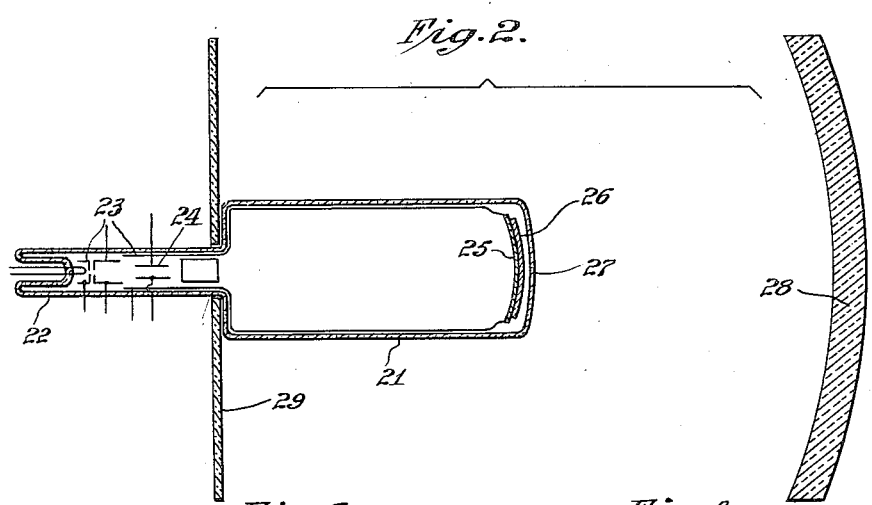
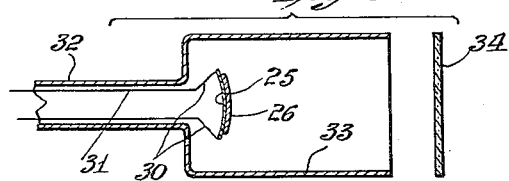
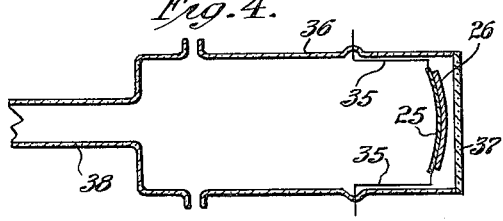
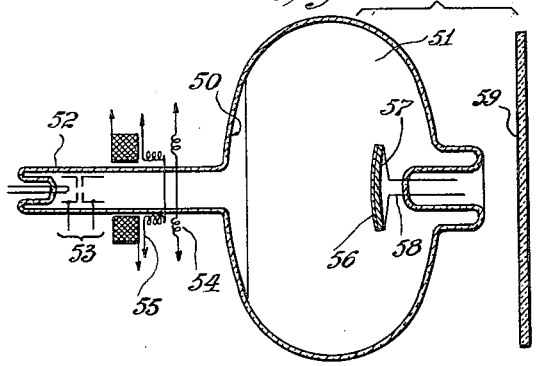
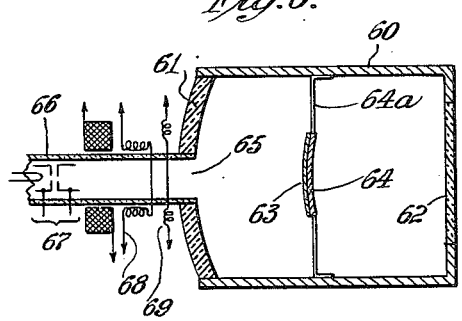
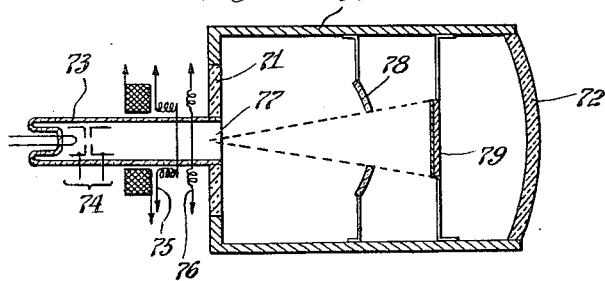
INVENTOR
*Constantin S. Szegho*
BY *Paul Kolisch*
ATTORNEY Patented Jan. 17, 1950

2,495,035

UNITED STATES PATENT OFFICE 2,495,035

SCHMIDT PROJECTOR HAVING CATHODE-RAY TUBE COMPRISING SPHERICAL MIRROR

Constantin S. Szegho, New York, N. Y., assignor to The Rauland Corporation, Chicago, Ill., a corporation of Illinois Application May 13, 1942, Serial No. 442,835

6 Claims. (Cl. 178—7.5)

This invention relates to new and useful improvements in cathode ray tube projectors of the kind employed in large screen television receivers.

The object of the invention is to increase the light output of projectors using a mirror optic, such as the Schmidt camera. (James G. Baker: The solid-glass Schmidt camera and a family of flat-field cameras, equivalent in performance to the Schmidt camera. Proceedings of American Philosophical Society, vol. 82, No. 3, April 30, 1940.)

In the Schmidt camera type of projector a cathode ray tube having fluorescent material deposited on a transparent support, usually a wall of the cathode ray tube, is located between a large diameter spherical mirror and a correcting plate. The light is first produced at the cathode or back side of surface of the fluorescent powder and then passes through the powder to emerge from the front surface contacting with the transparent support, usually the end wall of the tube. The electrons impinge on the back side surface of the layer. The outside surface faces the spherical mirror. In such back surface projection much of the light is lost by absorption in the fluorescent layer.

In accordance with the present invention, the light output of the projector is increased by providing a front surface projection cathode ray tube between the mirror and the correcting plate of a Schmidt camera type of optical system.

In one embodiment of the invention, the tube has an optically homogeneous, thin, even-walled, transparent, axially symmetrical envelope which does not distort the rays passing from the fluorescent screen to the mirror and then to the correcting plate, the mirror and plate being separate from the tube.

The fluorescent layer may be subjected to electronic bombardment on the side on which it is viewed, or it may be mounted on a thin membrane of conducting material pierced by the electrons which penetrate the layer of fluorescent material and cause the activation of its exposed surface.

Another embodiment of the invention combines in a unitary structure at least some of the elements of the cathode ray tube and the Schmidt camera.

Other embodiments and features will appear from the following description and the appended claims.

In the drawings:

Figs. 1 and 1a are diagrammatic illustrations of two closely related embodiments;

Fig. 2 a diagrammatic illustration of another embodiment;

Figs. 3 and 4 illustrate two methods of assembling the tube of Fig. 2;

Fig. 5 is a diagrammatic illustration of a combined cathode ray tube and spherical mirror structure; and Figs. 6 and 7 diagrammatically illustrate two embodiments in which the tube, mirror and correcting plate are assembled as a unitary structure.

In Figs. 1 and 1a, 1 is the spherical mirror and 2 the customary correcting plate of a Schmidt camera, and 3 is the evacuated cathode ray tube envelope located between the two. In all the drawings the correcting plate is shown flat, although its surface is in fact slightly distorted. The cathode ray tube is of the front surface projection type, i. e., in which electrons shot from an electron gun 4 in the neck 5 of the tube impinge on a fluorescent surface 6. The fluorescent surface 6 is symmetrically mounted with respect to the neck opening on a convex metal screen 7 supported on a stem 8. This makes possible high accelerating voltages for the electrons without these being slowed down by negative charges that accumulate on a non-conductive support. Any accumulation of negative charge can be bled off through a conductor connected to the conductive support (for example, through support 58 of Fig. 5), whereby the conductive support may be electrically connected through the wall of the tube to an external circuit element. To make such external connections possible, leads are shown in Figs. 1 and 1a extending through stem 8. Outside the tube a lead may be connected to a source of direct current potential for polarizing the conductive support at some optimum value. The neck 5 of the tube projects through an opening 9 in the mirror 1 and the customary vertical and horizontal deflecting means 10 and 11 and the focussing coil 12 are all located back of the mirror.

The envelope 3 is of an optically homogeneous, thin, even-walled, transparent material, e. g., glass, which does not distort the light rays passing from the screen 6 to the spherical mirror 1 and reflected by the mirror through the plate 2. In Fig. 1 the envelope is spherical and in Fig. 1a it is a flattened sphere.

The manufacture of a large diameter spherical or an axially symmetrical vessel is a relatively simple glass-blowing operation because the vessel can be rotated in the mold. Its walls then can be kept thin and to a uniform thickness, thus guarding against distortion of the optical image. Since the wall is thin, optical distortion resulting from remaining lack of ununiformity is minimized. A reasonable tolerance of uniformity, the angle subtended by the undeflected ray and the ray deflected owing to non-uniformity and finite thickness of the wall, is approximately thirty seconds of the arc. In the construction here illustrated, straight scanning is used, the gun 4 being in alignment with the center of the screen 6 insuring perfect geometry of the television picture without the necessity of correcting for distortion which is obtained in structures in which the gun is located out of the center of the screen. All the coils and deflecting means being positioned behind the mirror 1, there is no obstruction of the light passing from the mirror to the correcting plate.

In the case illustrated in Fig. 1a, the radius of the glass envelope is at both the side of the mirror and the side of the correcting plate, the same as the radius of curvature of the spherical mirror.

The spacing between the screen 6, mirror 1 and plate 2, and the shapes of the mirror and plate must, of course, be determined in accordance with the standard practice in this art corresponding to the magnification and aperture ratio and optical correction required.

Another solution of the problem is illustrated in Fig. 2 in which 21 is an evacuated glass envelope having a neck 22. The neck encloses an electron gun 23 and vertical and horizontal deflecting plates 24. The bell-shaped main chamber of the envelope 21 contains a disc 25 of aluminum having a thickness of approximately 5 microns. The disc is curved and has its convex surface coated with a layer of fluorescent material 26. The curved end wall 27 of the envelope 21 is parallel with the adjacent coated aluminum disc 25 and faces a spherical mirror 28. The neck 22 of the tube projects through a central opening in a correcting plate 29. The mirror 28 and plate 29 constitute a Schmidt camera type of optic, the radius of curvature of the disc 25 being the focal length of the optic.

High voltage electrons produced by the gun 23 will pierce the aluminum member 25 and penetrate the fluorescent layer 26 to cause the excitation of its outside surface near the window 27 which will allow substantially all the light from the fluorescent screen to reach the mirror 28. At the customary anode voltage of approximately 50,000 volts the energy loss of electrons going through such aluminum disc is only about 5%. No negative charge will be present to slow-down the electrons which can, therefore, penetrate to a sufficient depth into the fluorescent layer 27 to produce the necessary light effects.

If the space between the spherical mirror and the correcting plate is filled with a liquid of high refraction index the light output of this arrangement can be further increased by a factor which is the square of the refraction index. Instead of filling the space with an immersion liquid this space can be filled with solid material such as glass or plastic. In this case the spherical mirror and the correcting surface will preferably constitute the end faces of the solid.

Figs. 3 and 4 show two arrangements for assembling the tube structure schematically illustrated in Fig. 2. In Fig. 3 the curved aluminum disc 25 is mounted on wires 30 connected with the anode structure 31 in the neck 32 of a glass envelope. The body of the envelope 33 is cylindrical, the end of which may be closed by a flat glass window 34 during which operation the anode structure with the fluorescent screen is withdrawn towards the cathode. In the structure shown in Fig. 4, the aluminum disc 25 is supported on wires 35 which are sealed into the wall of cylinder 36. One end of which is closed off by a flat window 37, the other open end may be joined to the neck portion 38 of the tube at such a distance from the aluminum member that it will not be damaged.

Figs. 5, 6 and 7 illustrate the combination in a single structure of at least some of the elements of a cathode ray tube and a Schmidt camera thus making possible the projection of large images with minimum loss of light.

Referring first to Fig. 5, 51 is an evacuated envelope of a cathode ray tube having a neck 52 axially projecting therefrom. The neck encloses the usual electron gun 53 and is equipped with vertical and horizontal deflecting means 54 and 55. Aligned with the neck opening, a convex fluorescent surface 56 is provided on a metal screen 57 which by means of a support 58 is mounted in a stem formed in the envelope 51 at a point diametrically opposed to the neck 52. The portion of the envelope 51 surrounding the opening of neck 52 is coated to form a spherical mirror 50 with which a correcting plate 59 located outside the envelope 51 is aligned. The correcting plate 59 and mirror 50 form a Schmidt camera with the fluorescent surface 56 properly located between them. Electrons emitted by the gun 53 impinge on the surface 56 and the image appearing on this surface is reflected through the correcting plate 59.

The curvature, composition and thickness of the envelope through which light reflected by mirror 50 must pass on its way to the plate 59 are such as to cause as little distortion as is possible. Further to reduce the distortion, the structure shown in Fig. 6 may be adopted.

In this structure the cathode ray tube envelope consists of a cylinder 60, one end of which is closed by a spherical mirror 61, and the other end by a correcting plate 62. Between these two is located within the envelope a convex layer of fluorescent material 63 on a metallic support 64 in alignment with a central opening 65 in the mirror 61 and mounted by the arms 64a on the envelope. The shapes of mirror 61 and plate 62 and their positioning with respect to one another and with respect to the fluorescent surface 63 should be determined in accordance with the practice well known in the construction of Schmidt camera type of optical systems.

A neck 66 is attached to the mirror 61 and communicates with the envelope 60 through a central opening 65. The neck encloses the usual electron gun 67 and has associated with it the vertical and horizontal deflecting means 68 and 69.

The cylinder 60 as the cylinders 33 and 36 (Figs. 3 and 4) may be of glass, metal or ceramic material, and the envelope may be either evacuated and sealed-off, or it may be continuously pumped.

It will be observed that one advantage of this construction is that the light rays emerging from the front surface of the fluorescent screen have not to pass through any refracting medium on their way to the spherical mirror and the correcting plate.

In the construction shown in Fig. 7, a flat field type of Schmidt camera is combined with a cathode ray tube. Here a cylinder 70 has one end closed by a correcting plate 71 and the other end by a concave mirror 72. A neck 73 containing the usual electron gun 74 and deflecting means 75, 76 is connected with the envelope through a central opening 77 in the correcting plate 71. Electrons shot out from gun 74 pass through an aperture in an auxiliary convex mirror 78 on to a flat fluorescent surface 79 and the image formed on the fluorescent surface is reflected by the mirror 78 through to the mirror 72 and then through plate 71.

The auxiliary mirror 78 is metallized at the back and around the opening to prevent charging-up by stray electrons.

What I claim is:

1. In combination, a fluorescent surface, a support of conducting material therefor, an electron gun for exciting said surface, a mirror for reflecting light emanating and emerging from said surface, a correcting plate in the path of the light rays reflected by said mirror, an evacuated envelope enclosing said surface and having a wall made up of the mirror, an opposite wall made up of said correcting plate and a neck enclosing said gun and projecting through a central aperture in said mirror.

2. In combination, a fluorescent surface, a support of conducting material therefor, an electron gun for exciting said surface, a mirror for reflecting light emanating and emerging from said surface, a correcting plate in the path of the light rays reflected by said mirror, an evacuated envelope enclosing said gun and surface and the wall of which is partly made up of said mirror and plate.

3. A Schmidt optical system television projector comprising in combination, a fluorescent surface, a support of conducting material therefor, an electron gun for exciting said surface, a spherical mirror for reflecting light emanating and emerging from said surface, an evacuated envelope having a bulb portion enclosing said surface and support and having a spherical surface on which said mirror is formed, a neck for said envelope enclosing said gun and projecting through a central aperture in said mirror, a correcting plate located outside of said envelope in the path of the light rays reflected by said mirror, the bulb portion having opposite to said spherical surface and in the path of rays reflected from the mirror to the correcting plate a transparent window wall of small curvature, the bulb portion being of such size that its wall connecting said spherical surface and said window wall lies beyond the periphery of the mirror so that light which passes through any part of the bulb in going from the mirror to the correcting plate will be incident upon that portion at an angle near to 90°.

4. A Schmidt optical system television projector comprising in combination, a convex fluorescent layer, a support of conducting material therefor, an electron gun emitting electrons which impinge on the exposed surface of said layer, an evacuated envelope having a bulb portion enclosing said layer and support and a neck enclosing said gun, a spherical mirror having a common optical axis with and being concave toward said exposed surface for reflecting light emanating and emerging therefrom, and having a central aperture through which said neck projects, and a correcting plate in the path of the light rays reflected by said mirror, the bulb portion comprising a peripheral wall portion which extends for some distance in a direction substantially parallel to the optical axis between the mirror and the correcting plate, and the bulb portion being of such size with respect to the mirror that rays which are reflected from it to the correcting plate will pass by said wall portion without being intercepted by it.

5. In combination, a fluorescent surface, a support of conducting material therefor, an electron gun for exciting said surface, a mirror for reflecting light emanating and emerging from said surface, a correcting plate in the path of the light rays reflected by said mirror, an evacuated envelope enclosing said gun and surface and the wall of which is partly made up of said mirror and plate, and an electrical connection extending from the support through the wall of the envelope to the space outside of it.

6. A television receiving tube comprising, an envelope having a transparent wall, a spherical reflecting member in said envelope facing said transparent wall, a spherical fluorescent screen disposed in said envelope and having the spherical surface thereof parallel to and facing said reflecting member, a lens to correct for spherical aberration of said reflecting member disposed in spaced relation to and facing said reflecting member, an electron gun in said envelope disposed in cooperative relationship to said screen for projecting a cathode ray onto said screen, and means for deflecting said cathode ray over said screen to reproduce a television image thereon.

CONSTANTIN S. SZEGHO.

REFERENCES CITED

The following references are of record in the file of this patent:

UNITED STATES PATENTS

| Number | Name | Date |
|---|---|---|
| 2,166,399 | Dowsett et al. | July 18, 1939 |
| 2,229,302 | Martin et al. | Jan. 21, 1941 |
| 2,274,116 | Wright | Feb. 24, 1942 |
| 2,276,360 | Von Ardenne | Mar. 17, 1942 |
| 2,292,979 | Wald | Aug. 11, 1942 |
| 2,295,779 | Epstein | Sept. 15, 1942 |
| 2,298,808 | Ramberg | Oct. 13, 1942 |
| 2,305,855 | Epstein et al. | Dec. 22, 1942 |

FOREIGN PATENTS

| Number | Country | Date |
|---|---|---|
| 443,788 | Great Britain | Mar. 5, 1936 |
| 463,891 | Great Britain | Apr. 8, 1937 |
| 487,241 | Great Britain | June 16, 1938 |

OTHER REFERENCES

"Telescoptics," Scientific American, Aug. 1939, p. 118–123.